June 30, 1970 — D. G. McCRACKEN — 3,517,952

SWIVEL JOINT

Filed Jan. 3, 1969

INVENTOR.
Donald G. McCracken
BY Jerry K. Harness
his ATTORNEY.

United States Patent Office 3,517,952
Patented June 30, 1970

3,517,952
SWIVEL JOINT
Donald G. McCracken, McHenry, Ill., assignor to Aeroquip Corporation, Jackson, Mich.
Filed Jan. 3, 1969, Ser. No. 788,733
Int. Cl. F16l 27/08
U.S. Cl. 285—276   5 Claims

ABSTRACT OF THE DISCLOSURE

A swivel joint having interfitting male and female bodies connected by a ball bearing which permits relative coaxial rotation of the bodies, a seal between the bodies preventing leakage of the fluid. A snap ring retains the ball bearing in place. A dust seal for the bearing is disposed in a cavity formed in an end cap. This cap is preferably thermoplastic, gives additional support to the bodies under extreme transverse load conditions, and seals and protects the snap ring. The end cap is held in place by a raised bead which snaps into a groove in the female body, and also serves to retain bearing lubrication.

BACKGROUND OF THE INVENTION

Field of the Invention

The invention relates to swivel joints for fluid lines, and more specifically to joints which permit relative rotation between two parts of a fluid line on their common axis.

Description of the prior art

It is known to have swivel joints comprising interfitting male and female bodies between which a ball bearing is disposed to permit relative rotation, the ball bearing being held in place by a snap ring.

SUMMARY OF THE INVENTION

The present invention resides in the construction and function of a novel end cap applied to the female body, and the parts associated with this end cap, which result in a combination having advantages not found in previous devices of this type. The end cap is preferably constructed of a thermoplastic material and has a cavity for receiving a polyurethane foam dust seal which protects the ball bearing. Flexible metal could be used in place of the thermoplastic material. Moreover, the end cap is close enough to the male body to act as an additional support for this body when the joint is subjected to excessive lateral loads. The end cap also serves to conceal and protect the snap ring, and to retain bearing lubrication.

DESCRIPTION OF THE PREFERRED EMBODIMENT

Figure 1:
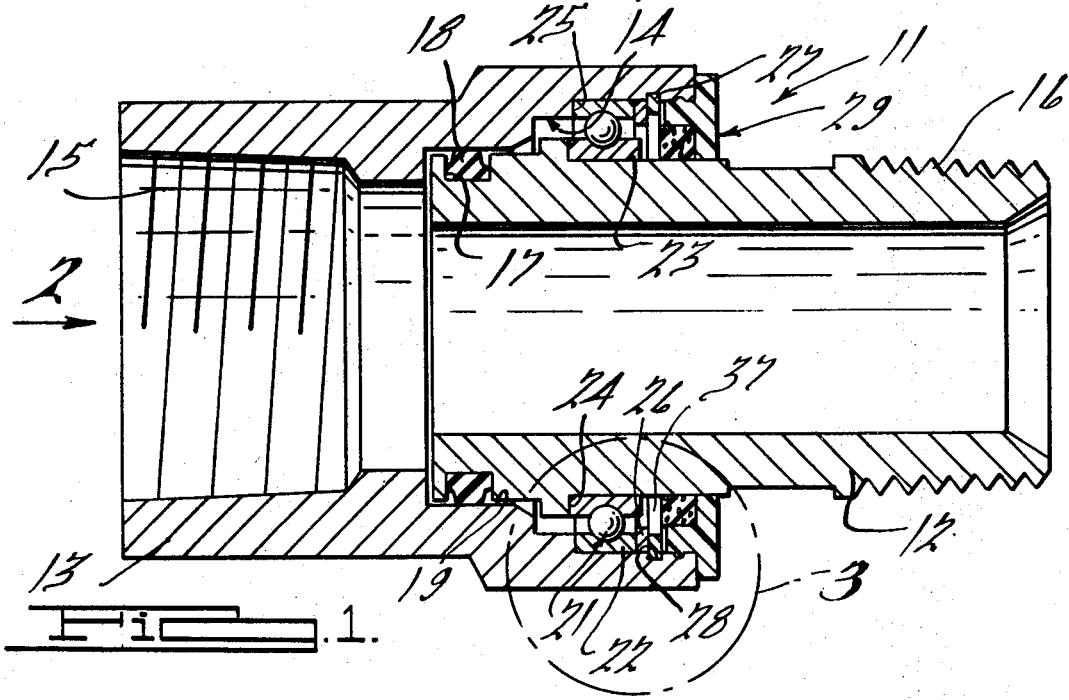
FIG. 1 is a side elevational view in elevation of the swivel joint of this invention.
Figure 2:
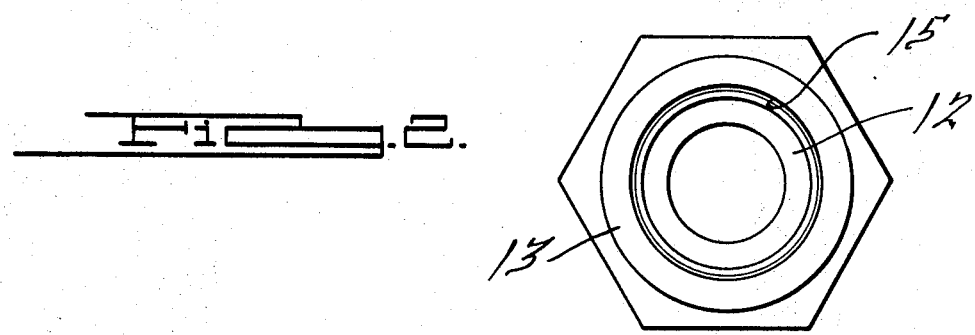
FIG. 2 is an end elevational view thereof taken in the direction of the arrow 2.

The swivel joint is generally indicated at 11 and comprises a male body 12 and a female body 13 which are in interfitting relation. More particularly, female body 13 has a bore generally indicated at 14 at one end which receives male body 12. The female body has a port 15 at one end with female threads, and body 12 has a male thread 16 at its outer end. Male body 12 has an annular cavity 17 within which is disposed a fluid seal 18 engaging the bore portion 19 of bore 14. The male body in the vicinity of seal 18 is closely adjacent bore portion 19. A ball bearing generally indicated at 21 is disposed between the bodies, this bearing having an outer race 22 mounted in an enlarged portion of bore 14 and an inner race 23 secured to male body 12. Ball bearing 21 is held against shoulders 24 and 25 on members 12 and 13 respectively, by a washer 26 and a snap ring 27. The latter is disposed in a groove 28 in bore 14. Snap ring 27 serves to retain ball bearing 21 in position.

Figure 3:
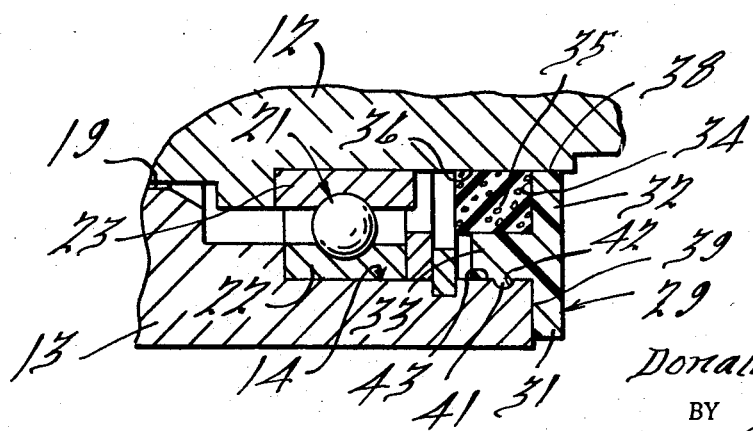
FIG. 3 is an enlarged fragmentary elevational view in cross section taken in the area marked 3 of FIG. 1.

The end cap is generally indicated at 29 and comprises a member made preferably of thermoplastic material having an outwardly extending radial flange portion 31, an inwardly extending radial bearing portion 32, and a cylindrical mounting portion 33 extending right angles to the flange and bearing portions to form a somewhat T-shaped cross section, as seen in FIG. 3. The recess 34 formed by portions 32 and 33 of the end cap serve to retain a polyurethane of similarly constructed foam dust seal 35 which has a rectangular cross-sectioned shape. This seal will engage surface 36 of body 12 in order to prevent dust and other foreign matter from entering the chamber 37 which contains bearing 21.

The inner surface 38 of the cap bearing portion 32 is close to surface 36 so that any undue side loading on the joint will permit end cap 29 to act as an additional radial support for the joint.

Flange portion 31 of end cap 29 engages end surface 39 of female body 13. Retaining portion 33 of the end cap has a raised annular bead 41 which is received by a groove 42 in portion 43 of female body bore 14.

When assembling the joint, male body 12 will be inserted in female body 13. After ball bearing 21, washer 26 and snap ring 27 have been assembled, dust seal 35 and end cap 29 will be mounted in position. This may be accomplished by pressing end cap 29 into the bore of body 13 until bead 41 snaps into place in groove 42.

It will be noted that the assembly is such that end cap 29 will conceal and protect snap ring 27 from exterior damage or tampering.

In order to remove the end cap, a knife blade or screwdriver may be forced between surface 39 and flange 31, and the cap pried loose.

What is claimed is:

1. In a swivel joint, interfitting male and female bodies having a fluid seal therebetween, a bearing disposed between said bodies on the side of said fluid seal toward the outer end of said female body, a dust seal surrounding and engaging said male body, and an end cap being generally T-shaped and comprising an annular flexible member having a flange portion, a bearing portion and a retaining portion, the flange portion abutting the radial end surface of said female body, the bearing portion extending into close juxtaposition with said male body to thereby additionally support said joint when subjected to excessive sideward forces, said retaining portion having a bead which interfits with a groove in the female body bore whereby said end cap may be snapped into place, the end cap having a recess receiving said dust seal.

2. The combination according to claim 1, said bearing comprising a ball bearing, and a snap ring retained by a groove in said female member and serving to retain said ball bearing in position, said end cap being disposed outwardly of said snap ring so as to conceal and protect the snap ring from exterior damage and tampering.

3. The combination of claim 1, said end cap being made of thermoplastic material.

4. The combination according to claim 1, said male body in the vicinity of said fluid seal being closely adjacent the bore of said female body.

5. The combination according to claim 2, further provided with a washer between said bearing and said snap ring.

References Cited

UNITED STATES PATENTS

| 2,270,928 | 1/1942 | Browne | 285—276 |
| 3,371,937 | 3/1968 | Maeda | 277—189 |
| 3,414,273 | 12/1968 | Sumner | 277—189 X |

FOREIGN PATENTS

| 121,890 | 8/1946 | Australia. |
| 643,029 | 9/1950 | Great Britain. |

THOMAS F. CALLAGHAN, Primary Examiner

U.S. Cl. X.R.

285—379; 277—189